United States Patent [19]
Oliver

[11] 3,729,990
[45] May 1, 1973

[54] LOAD CELL FOR AIRCRAFT CONTROL STICK

[75] Inventor: Kenneth L. Oliver, Phoenix, Ariz.

[73] Assignee: Sperry Rand Corporation, New York, N.Y.

[22] Filed: May 10, 1971

[21] Appl. No.: 141,570

[52] U.S. Cl. .................................73/133, 244/83 R
[51] Int. Cl. .................................G01l 5/16
[58] Field of Search ...............73/88.5 R, 133, 141 A, 73/147, 189, 117.4; 244/83 R, 83 E

[56] References Cited

UNITED STATES PATENTS

| | | | |
|---|---|---|---|
| 3,434,342 | 3/1969 | Kazmarek | 73/133 |
| 3,365,943 | 1/1968 | Bloch | 73/189 |
| 2,953,019 | 9/1960 | Rosenberg | 73/117.4 |
| 3,138,953 | 6/1964 | Ormond | 73/117.4 |
| 3,492,864 | 2/1970 | Kraeling et al. | 73/133 |
| 3,561,263 | 2/1971 | Ward et al. | 73/133 |
| 3,620,073 | 11/1971 | Robbins | 73/133 |

FOREIGN PATENTS OR APPLICATIONS

| | | | |
|---|---|---|---|
| 149,829 | 1962 | U.S.S.R. | 73/88.5 R |

Primary Examiner—Charles A. Ruehl
Attorney—S. C. Yeaton

[57] ABSTRACT

An aircraft control stick contains a load cell for measuring shear forces applied to the stick. The cell includes a flat base plate for mounting the cell in the control stick, an upper plate for receiving the forces applied to the control stick, and an intermediate plate for mounting the force-responsive elements of the cell. The intermediate plate is supported above and parallel to the base plate by a plurality of flat spring flexure members disposed in planes normal to the plane of the two plates and parallel to one another so as to permit relative motion between the two plates only in the direction at right angles to the planes of the spring flexure members. A plurality of flat cantilevered load beams are also mounted on the base plate in planes parallel to the spring flexure members. Yoke members mounted on the intermediate plate straddle the free ends of the load beams so as to contact and deflect the load beams when deflections of the spring flexure members exceed a preset threshold value. Electrical strain gauges in each cantilevered load beam provide electrical output signals representative of the deflection of the load beams. The upper flat plate is disposed in the plane parallel to and above the intermediate plate. The upper plate is mechanically coupled to the intermediate plate by a second array of spring flexure members and cantilevered load beams.

9 Claims, 3 Drawing Figures

Patented May 1, 1973

3,729,990

INVENTOR
KENNETH L. OLIVER
BY
Joseph M Roehl
ATTORNEY

LOAD CELL FOR AIRCRAFT CONTROL STICK

BACKGROUND OF THE INVENTION

1. Field of the Invention

The present invention relates to load cells and more specifically to load cells suitable for sensing forces applied to an aircraft control stick.

2. Description of the Prior Art

Load cells particularly suitable for measuring forces applied by a pilot to an aircraft control stick are known in the art. U.S. Pat No. 3,447,766 issued to R. D. Palfreyman, on June 3, 1969, for instance, concerns a control stick force sensor employing a load cell that features orthogonal spring members that deflect in response to control forces applied to the stick by the pilot. Semiconductor strain gauges mounted on the spring members provide electrical output signals corresponding to the flexure of the spring members. While the load cells of such prior art control sticks represent a significant technological advance, such cells display characteristics that limit their usefulness.

For instance, hysteresis caused by the joints in the array limit the minimum force which can be detected accurately. Furthermore, a certain non-linearity is experienced when small forces are encountered. Thus small forces inadvertently applied to the control stick merely by the weight of the pilot's hands may provide sufficient electrical output to cause errors under such circumstances.

SUMMARY OF THE INVENTION

The present invention utilizes a first array of cantilevered load beams arranged to sense shear forces in a first direction and a second array arranged to sense shear forces in a second direction orthogonal to the forces that actuate the first array. Quadrature components of shear forces applied in directions intermediate to said orthogonal directions can be obtained from the individual arrays.

DESCRIPTION OF THE PREFERRED EMBODIMENT

Figure 1:
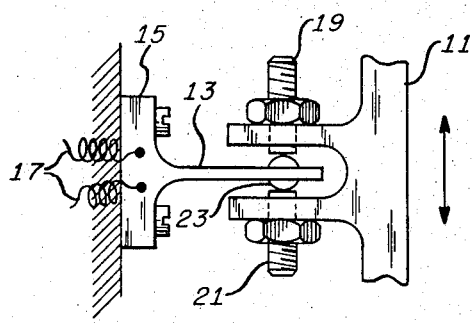
FIG. 1 is a drawing illustrating a force sensing element of the type used in the present invention.

Copending patent application Serial Number 116,334 entitled, "Control Wheel Force Sensors", filed in my name and assigned to the present assignee, describes a sensing element of the type illustrated in FIG. 1 in which a yoke member 11 actuates a flat cantilevered load beam 13. A strain gauge 15 senses deflections of the load beam 13 and provides output signals on a pair of leads 17. The yoke member 11 is movable with respect to the cantilevered beam in the direction indicated by the arrows in FIG. 1. The yoke member contains a pair of adjustment screws 19 and 21 which actuate a spherical member 23 in the free end of the cantilevered beam. The adjustment screws can be preset so as to provide a desired dead zone. Thus the yoke member 11, straddling the free end of the cantilevered beam, can move through a predetermined distance before deflecting the cantilevered beam.

Figure 2:
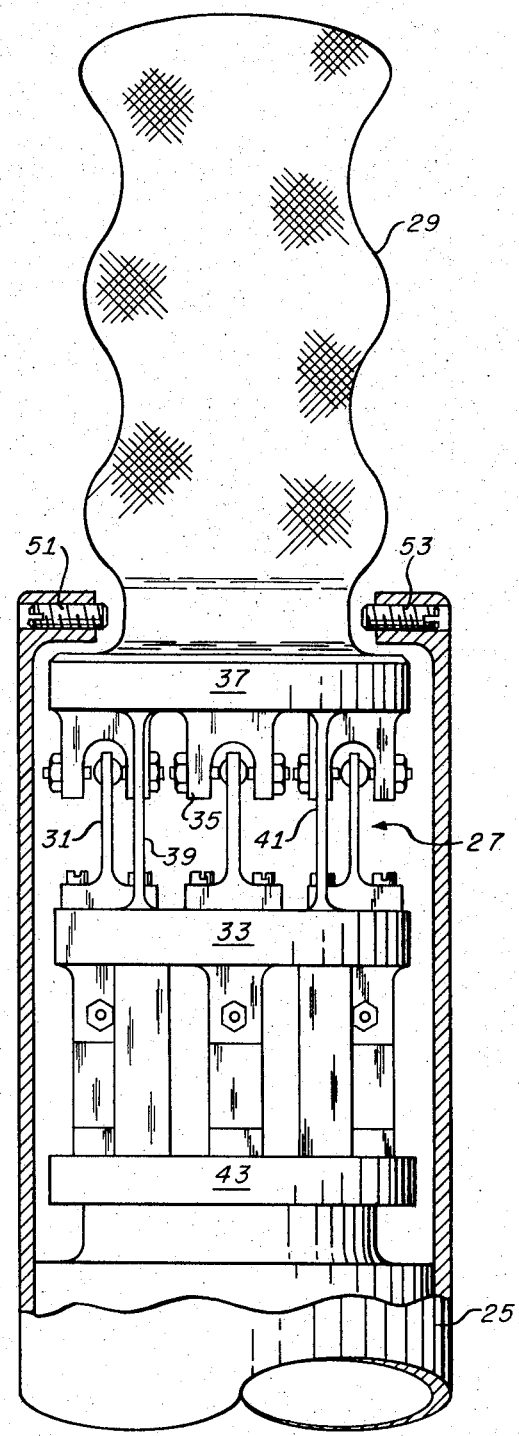
FIG. 2 is a drawing, partly in cross section, illustrating an aircraft control stick employing the principles of the present invention.

FIG. 2 illustrates a control stick 25 employing a load cell 27 constructed according to the principles of the invention. The load cell contains a first array of cantilevered load beams which respond to roll forces applied to the control stick through a handgrip 29. The cantilevered load beams such as the load beam 31 are supported on an intermediate plate 33 and actuated by yoke members such as the member 35 supported on an upper flat plate 37. The intermediate flat plate and the upper flat plate are mechanically coupled through spring flexure members 39 and 41. Each of the cantilevered load beams and the spring flexure members consist essentially of flat strip-like resilient members having rectangular cross sections and disposed in planes normal to the plane of the paper. Thus the aforementioned elements constitute an upper array that responds to roll forces applied in the plane of the paper but are substantially immune to pitch forces applied in a plane normal to the plane of the paper.

A lower base plate 43 of the load cell 27 is secured to the housing of the control stick 25. The intermediate flat plate 33 is mechanically coupled to the base plate 43 through a second array of cantilevered load beams and spring flexure members. The members in the latter array, however, are disposed so that their broad dimensions lie in the plane of the paper. Thus the lower array of elements respond only to pitch forces applied to the control stick.

In practice, the load beams are made to be much more compliant than the flexure members so that the flexure members absorb most of the applied forces. As presently preferred, the flexure members and load beams are constructed with rectangular cross sections having one lateral dimension that is relatively broad and another lateral dimension relatively thin so that the element can be easily flexed in one dimension but is substantially rigid in the orthogonal direction. However, equivalent configurations may be used if desired.

Figure 3:
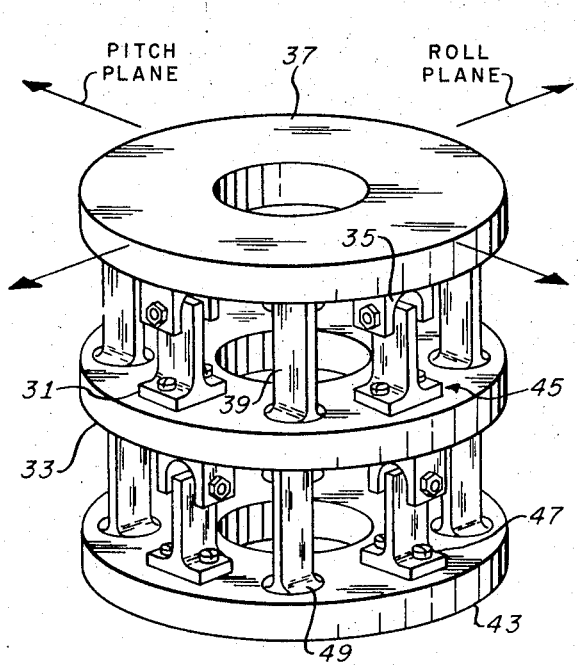
FIG. 3 is an isometric drawing of a load cell constructed according to the principles of the present invention.

The arrangement of the various components can better be visualized by referring to the isometric drawing of the load cell pictured in FIG. 3 wherein the direction of roll and pitch forces is illustrated by orthogonal arrows. The upper or roll plate 37 supports yoke members such as the member 35 and flexure members such as the member 39. As illustrated in FIG. 3, the intermediate or pitch plate 33 supports cantilevered load beams such as the beam 31. The cantilevered load beams are mounted on the plate 33 so that the strain gauge portions such as the portion 45 are secured to the plate 33. This upper array of elements consists of four cantilevered load beams and four spring flexure members. It will be noticed that the plane of each element in the upper array is parallel to the plane of the pitch forces. Thus the upper array of elements is substantially immune to pitch forces and responsive only to roll forces.

The base plate 43 supports cantilevered load beams such as the load beam 47. The base plate is coupled to the intermediate or pitch plate 33 through four spring flexure members such as member 49. The broad dimension of each element in the latter array is aligned in a plane parallel to the plane of roll forces and thus orthogonal to the broad dimensions of the elements in the upper array. Thus the elements in the lower array respond only to forces applied in the pitch plane.

Because of the orthogonal orientation of the two arrays, substantially no cross coupling occurs between the elements in the two arrays when forces applied to the handgrip lie entirely in the roll or pitch planes. However, forces applied to the handgrip in directions intermediate the roll and pitch planes induce deflections in the spring flexure members and thus create electrical output voltages equivalent to the quadrature components of the forces applied in these intermediate directions.

Because of the type of cantilevered load beams utilized in the present load cell, electrical output signals are derived from the cell only after a certain threshold force is exceeded. Thus small forces inadvertently applied to the handgrip by the pilot do not affect the cell.

Adjustable stop members such as the screws 51 and 53 (FIG. 2) may be included in the control stick mounting so that relative motion between the roll or pitch and base plates may be limited. Thus the upper and lower limits to which the cantilevered load beams are exposed may be adjusted so that the strain gauges operate only in their intermediate or linear regions.

Although the load cell illustrated in FIG. 3 contains a plurality of four sensing elements and four spring flexure elements in each array, it is to be understood that any practical number of elements may be utilized in practicing the invention.

In the event of failure of any element, the load cell may be readily dismantled so as to replace the defective element. Furthermore, because of the nature of the cantilevered load beam sensing elements, the individual elements may be calibrated before mounting in the control stick, thus facilitating maintenance and repair.

While the invention has been described in its preferred embodiment, it should be understood that the words which have been used are words of description rather than limitation and that changes within the purview of the appended claims may be made without departing from the true scope and spirit of the invention in its broader aspects.

I claim:

1. An improved electrical transducer for a control stick having a handgrip portion and a control stick portion, said transducer being of the type having a first resilient means capable of deflecting only in response to shear forces applied to said handgrip in a first direction, second resilient means capable of deflecting only in response to shear forces applied in a direction at right angles to said first direction, and first and second electrical sensing means individually responsive to deflections of said first and second resilient means respectively, said improvement comprising a top plate secured to said handgrip portion, a bottom plate secured to said control stick portion and an intermediate plate disposed between said top and bottom plates, said top and intermediate plates being mechanically coupled through said first resilient means, said intermediate and bottom plates being mechanically coupled through said second resilient means, each of said electrical sensing means being in the form of cantilevered beams arranged to flex only in the direction that the corresponding resilient means is capable of flexing, said cantilevered beams being actuated by yoke members adjusted to deflect said cantilevered beams only after the corresponding resilient means has been deflected through a predetermined dead zone, the cantilevered beams of said first and second electrical sensing means being individually removably mounted on said intermediate and lower plates respectively.

2. A load cell for a vehicle control stick comprising a first array of elongated resilient elements disposed transversely between two parallel flat plates, each of said resilient elements being constructed to flex readily in a first lateral direction but being substantially rigid in a lateral direction at right angles to said first direction, said elements being aligned so that said first directions all lie in parallel planes, said array of resilient elements including spring flexure members and cantilevered load beams, each flexure member having its ends rigidly secured to said parallel plates, each of said cantilevered beams having a base end rigidly secured to one of said flat plates and a free end terminating near the second of said flat plates, a yoke member corresponding to each load beam, said yoke member being supported on said second flat plate and arranged to straddle the free end of the associated load beam, said yoke member being adjusted to contact the associated load beam only after the flexure members have been deflected a predetermined amount so as to establish a specified dead zone, and an electrical strain gauge in each load beam for providing an electrical signal indicative of the magnitude of any deflection in the load beam, said load cell further including a second array of resilient elements disposed transversely between one of said flat plates and a third parallel flat plate, said second array being constructed identically with said first array but being oriented to flex only in response to lateral forces at right angles to said first direction.

3. The load cell of claim 2 in which the vehicle is an aircraft and the forces to be measured are the roll and pitch forces applied to the control stick handgrip by the pilot, said first array being oriented so that said first lateral direction is parallel to the transverse axis of the aircraft to be controlled.

4. The load cell of claim 3 in which each of the resilient elements is an elongated member having a rectangular cross section proportioned to have a relatively broad dimension and a thin dimension, the resilient elements of said first array being aligned so that their broad dimensions are parallel to the longitudinal axis of the aircraft to be controlled.

5. The load cell of claim 4 wherein said third flat plate is adapted for mounting in said control stick and said second flat plate is adapted for mounting on said handgrip.

6. The load cell of claim 5 wherein the cantilevered load beams are more compliant than the spring flexure members whereby deflection forces are absorbed principally by said spring flexure members.

7. The load cell of claim 5 further including adjustable stop members for limiting the maximum motion of said third flat plate with respect to said second flat plate.

8. The load cell of claim 7 wherein said yoke members include adjustment means for altering the dead zone of individual load beams.

9. A load cell for detecting roll and pitch shear forces applied to the handgrip of an aircraft control stick comprising a flat base plate for securing the load cell to said control stick, an intermediate flat plate lying in a plane parallel to and above the plane of said base plate, said intermediate plate being mechanically coupled to said base plate by means of a first array of resilient elements, said first array including a plurality of spring flexure members each adapted to flex in response to a shear force applied to said hand grip in a first direction and being rigid in response to shear forces exerted on said handgrip in a direction orthogonal to said first direction, said first array further including a plurality of cantilevered load beams each secured to one of said plates and having a free end positioned near the other of said plates, means on said other plate for contacting and deflecting said beam when the relative motions of said plates resulting from flexures of said spring flexure members exceeds a predetermined amount, each of said cantilevered beams including an electrical strain gauge for producing an electrical signal indicative of deflections induced in the load beam, said load cell further including a flat upper plate for securing the cell to said handgrip, said upper plate being disposed in a plane parallel to and above said intermediate plate, said upper plate being further mechanically coupled to said intermediate plate through a second array of resilient elements, said second array being constructed so as to be identical with said first array but being oriented orthogonally with respect to said first array so as to flex in response to shear forces applied orthogonally with respect to said first direction and to be rigid with respect to forces applied in said first direction.

* * * * *